United States Patent [19]

Taylor

[11] 4,405,089
[45] Sep. 20, 1983

[54] MULTIPLE CONVEYOR

[75] Inventor: Bruce W. Taylor, Ballston Lake, N.Y.

[73] Assignee: Tarrant Manufacturing Company, Saratoga Springs, N.Y.

[21] Appl. No.: 425,431

[22] Filed: Sep. 28, 1982

[51] Int. Cl.³ .............................................. A01C 7/06
[52] U.S. Cl. .................................. 239/656; 239/673; 414/523
[58] Field of Search .............. 239/661, 672, 673, 676, 239/682, 656; 414/523, 528

[56] References Cited

U.S. PATENT DOCUMENTS

| 1,648,658 | 11/1927 | Nirider | 239/676 |
| 3,377,030 | 4/1968 | Swenson | 239/672 |
| 3,414,200 | 12/1968 | Savory | 239/673 |
| 4,124,167 | 11/1978 | Coleman | 239/673 |
| 4,253,612 | 3/1981 | Schulze | 239/672 |

FOREIGN PATENT DOCUMENTS

67095 5/1968 Australia .......................... 239/656

Primary Examiner—John J. Love
Assistant Examiner—Mary McCarthy
Attorney, Agent, or Firm—Walter F. Wessendorf, Jr.

[57] ABSTRACT

Disclosed is a unit insertable in a truck or trailer body to convert same into a multiple conveyor having multiple hoppers and conveyors for removing granular material therefrom via a spreading, unloading or dumping mode. The unit has two embodiments: in the one embodiment there are two hoppers and conveyors, and in the other embodiments there are three hoppers and conveyors.

9 Claims, 10 Drawing Figures

MULTIPLE CONVEYOR

BACKGROUND OF THE INVENTION

1. Technical Field

The invention relates to a unit insertable in a truck or trailer body to convert same into a multiple conveyor having multiple hoppers and multiple conveyors for removing granular materials therefrom via spreading, unloading or dumping modes.

2. Background Art

The prior art, U.S. Pat. No. 1,033,297, discloses a fertilizer distributer; U.S. Pat. No. 1,940,008 (Re. 19,801) discloses a distributor mechanism; U.S. Pat. No. 3,377,030 discloses a plural compartment apparatus; U.S. Pat. No. 3,419,221 discloses a material spreading and mixing apparatus; U.S. Pat. No. 3,559,894 discloses a material-spreading apparatus with interchangeable conveyor assemblies; U.S. Pat. No. 3,683,829 discloses a planting machine and size-adjustable hopper therefor.

The following discussion focuses on the problems inherent in the prior art and how this invention contributes to the solution of such prior-art problems.

The problem in the art is the need for a unit insertable in any open top or enclosed truck or trailer body to convert same into a multiple conveyor for spreading, unloading or dumping therefrom bulk granular material such as salt, sand, grain, fertilizer; and with such unit having multiple compartments and conveyors.

Since the unit can be inserted into or removed easily from a dump body or van type body and converted into a two or three hopper compartment spreader, a gain in the flexibility of use of vehicle type is realized.

On a comparable basis, the dual or triple conveyor embodiments of this invention with their respective dual or triple hopper compartments realize a loaded center of gravity that is over 8 inches lower in the case of the dual hopper than the conventional single hopper of the prior art and over 8½ inches lower in the case of the triple hopper. Such lower loaded center of gravity improves the safety of the vehicle in two ways:

(1) During panic stops the lower center of gravity will decrease the dynamic forward weight transfer thus decreasing the front axle and brake load during such stops.

(2) A lower center of gravity will decrease the chance of roll during sharp cornering or if the vehicle's wheels go into a ditch.

Using two or three hopper compartments with their respective two or three conveyors allows for faster unloading of matrial such as for stockpiling.

The lower height of the unit compared to the prior art yields more clearance in confined areas (headroom) in both loaded and empty states.

Less power is required because a slower conveying speed can be utilized to accomplish the same result by employing two or three conveyors.

By employing the drop spread chute with its diverging vanes instead of the conventional discharge chute and spinner assembly, some $700 in savings can be realized. The drop spread chute allows the material to be evenly spread over an eight-foot wide patern. In addition, the spreading vehicle can maneuver close to parked automobiles without damaging them with a blast of material from the spinner.

Accordingly, the object of the invention is to contribute to the solution of the discussed problems of the prior art by providing a unit that has two hopper compartments and two conveyors, or three hopper compartments and three conveyors, that can be inserted into and removed easily from a dump body or van type body and convert same into a respective two or three hopper compartment spreader while realizing and maintaining flexibility in the use of the particular vehicle type; while realizing a lower loaded center of gravity; while permitting spreading, unloading or dumping modes by versatility in the employment of the multiple hoppers and conveyors, the size of the discharge openings for the metering gates and the conveyor speeds utilized.

SUMMARY OF THE INVENTION

In accordance with the invention, there is provided a unit easily insertable in an open top or enclosed truck or trailer body to convert same into a multiple conveyor with either two hopper compartments and conveyors, or three hopper compartments and conveyors, for spreading, unloading or dumping therefrom granular material.

BRIEF DESCRIPTION OF THE DRAWINGS

The object and other objects of the invention should be discerned and appreciated by reference to the drawings, wherein like reference numerals refer to similar parts throughout the several views, in which.

DESCRIPTION OF THE PREFERRED EMBODIMENT

To facilitate the understanding of the invention, a nomenclature list is herewith provided:

1 generally refers to the dual conveyor embodiment
3 converging front wall
5 vertical rear wall
7 converging outside wall
9 converging outside wall
11 inverted, V-shaped longitudinal divider
13 converging middle wall of 11
15 converging middle wall of 11
17 angled portion of upstanding vertical wall 21
19 angled portion of upstanding vertical wall 23
21 upstanding vertical wall
23 upstanding vertical wall
25 angled portion of upstanding vertical wall 29
27 angled portion of upstanding vertical wall 31

Figure 1:
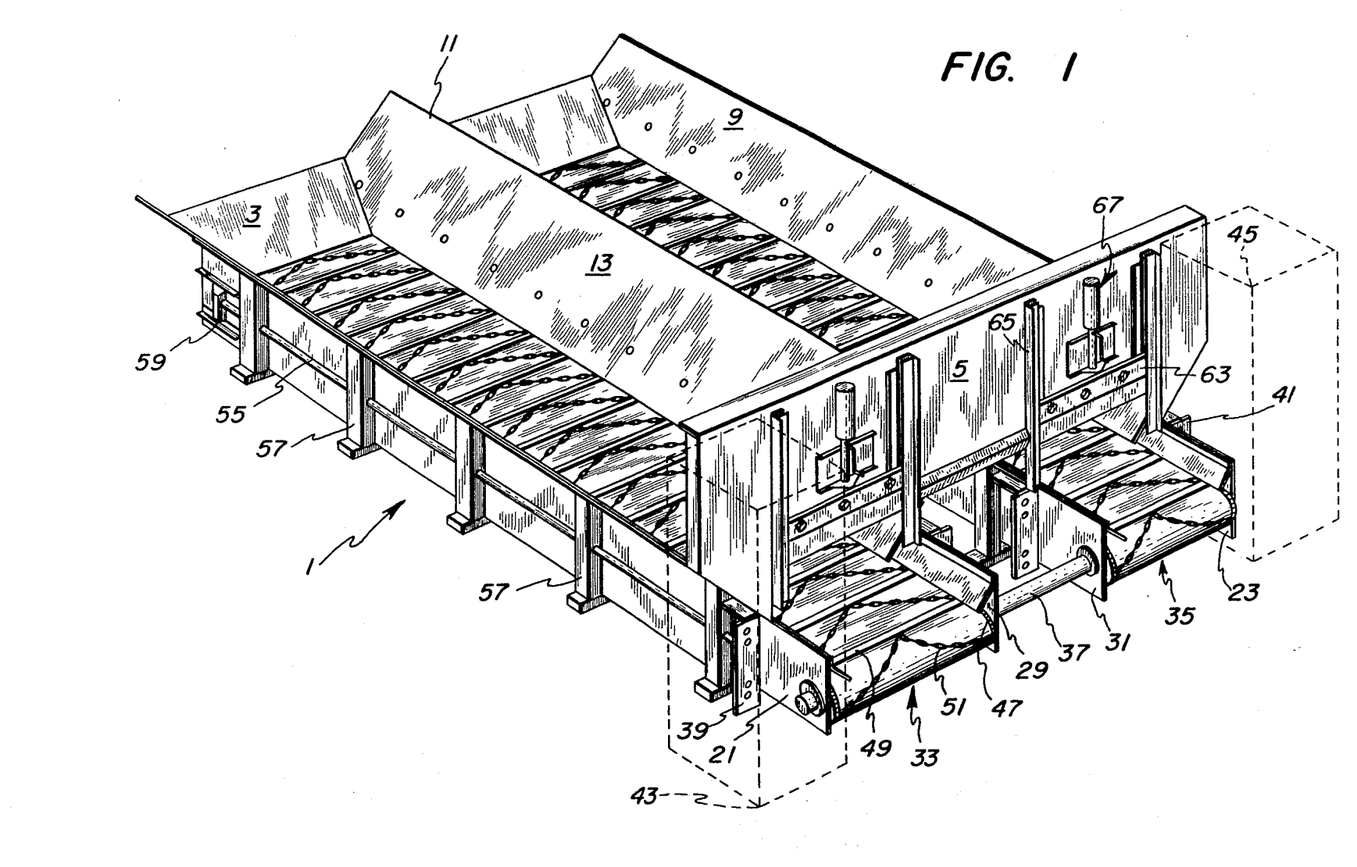
FIG. 1 is a view of the dual conveyor embodiment of the invention.

29 upstanding vertical wall
31 upstanding vertical wall
33 bottom longitudinally extending conveyor
35 bottom longitudinally extending conveyor
37 drive shaft
39 vertical flange
41 vertical flange
43 cover
45 cover
47 driven chain
49 rigid bar flight
51 angularly arranged chain
53 idler roller
55 take up screw
57 vertical support member
59 bearing plate
61 discharge opening
63 metering gate
65 angle iron guide
67 adjusting mechanism for gate 63
69 cross member
71 dump truck
73 dump truck body
75 slot in floor 77
77 floor of dump truck body 73
79 rear wheel of dump truck 71
81 sealing strip
83 front wall of body 73
85 side wall of body 73
87 side wall of body 73
89 discharge chute and spinner assembly
91 spinner disc
93 vanes of spinner disc 91
95 discharge chute
97 upper portion of chute 95
99 hydraulic motor
101 spinner adjusting arm mechanism
103 front deflector
105 spinner support
107 deflector
109 framing structure
111 drop spread chute
113 top grill
115 diverging vane
117 general reference to triple conveyor embodiment
119 longitudinal divider
121 converging middle wall
123 converging middle wall
125 vertical wall
127 vertical wall
129 bottom longitudinally extending conveyor
131 bottom longitudinally extending conveyor
133 bottom longitudinally extending conveyor
135 idler roller
137 metering gate
139 height adjustment mechanism
141 van body
143 drop spread chute
145 top grill
147 diverging vane In FIG. 1 of the drawings, reference numeral 1 generally refers to the dual conveyor embodiment of the invention.

Dual conveyor embodiment 1 has a converging front wall 3, a vertical rear wall 5, two converging outside walls 7 and 9, and in the middle an inverted, V-shaped longitudinal divider 11 defining converging middle walls 13 and 15, as shown. The converging outside walls 7 and 9 are bolted to correspondingly angled portions 17 and 19 of upstanding vertical walls 21 and 23. The converging middle walls 13 and 15 are bolted to correspondingly angled portions 25 and 27 of upstanding vertical walls 29 and 31.

Two bottom longitudinally extending conveyors 33 and 35 are disposed between vertical walls 21 and 29, and vertical walls 23 and 31, respectively, and mounted for operational use as shown. A drive shaft 37, operatively connected to conveyors 33 and 35, is powered and driven by a hydraulic-cylinder, power-transfer system of the type disclosed in U.S. Pat. Nos. 4,023,689 and 4,108,010 granted to Bruce W. Taylor et al on May 17, 1977 and Aug. 22, 1978, respectively, and assigned to Tarrant Manufacturing Company, the disclosure of which is incorporated herein by reference. Vertically disposed flanges 39 and 41 mount such power-transfer system. In FIG. 1, such power-transfer system is contained within covers 43 and 45 shown in phantom lines.

The conveyors 33 and 35 are of the type disclosed in U.S. Pat. No. 4,043,446 granted to William P. Tarrant on Aug. 23, 1977 and assigned to Tarrant Manufacturing Company. The conveyors 33 and 35 comprise driven chains 47, spaced-apart, rigid bar flights 49 carried cross-wise by and relative to the driven chains 47, and angularly arranged and disposed chains 51 carried between such rigid bar flights 49. The rigid bar flights 49 and angularly arranged chains 51 between such rigid bar flights 49 cooperate to effect continuous and positive conveying of the granular material. The drive chains 47 are operatively trained around idler rollers 53. Slack in the driven chains 47 is taken up by appropriate movement of the take up screws 55, freely carried in vertical support members 57 fixed to vertical walls 21 and 23. The take up screws 55 operatively engage bearing plates 59 carrying bearings that freely mount the idler rollers 53.

The vertical rear wall 5 has discharge openings 61 controlled by metering gates 63 for controlling the amount of granular material that can be discharged by the conveyors 33 and 35. The edges of the metering gates 63 are slidably engaged with guides in the form of angle irons 65. The height of the metering gates 63 is adjusted by means of a mechanism generally designated 67 and which is operatively mounted with respect to the metering gates 63. The amount of material conveyed is governed by the size of the discharge openings 61 and the speed of the conveyors 33 and 35 with respect to the spreading, unloading and dumping modes.

It should be noted that the converging outside walls 7 and 9, and converging middle walls 13 and 15, are so arranged and disposed such that their respective lower portions cover the driven chains 47. Also, that the upstanding vertical walls 29 and 31 are supported by understructure in the form of cross members 69 fixed therewith.

Figure 3:
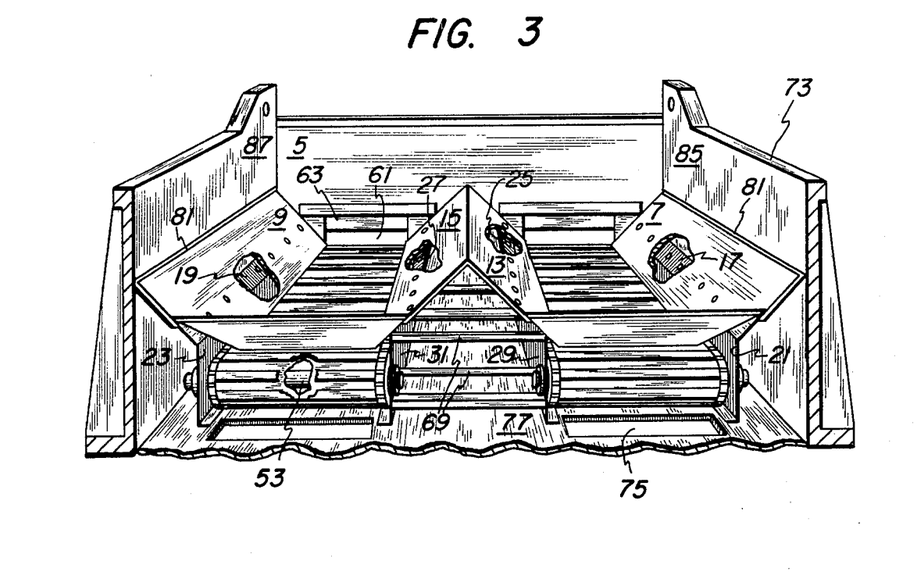
FIG. 3 is a view showing the dual conveyor embodiment inserted in a dump truck body.
Figure 4:
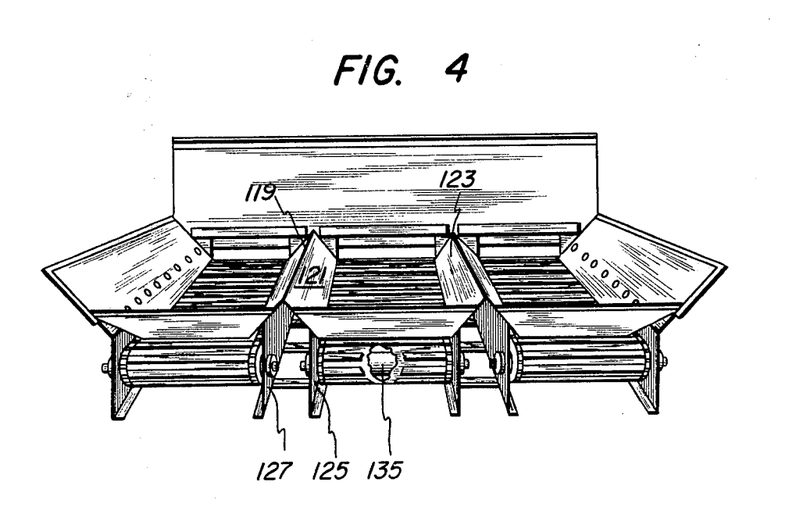
FIG. 4 is another view of the triple conveyor embodiment.
Figure 7:
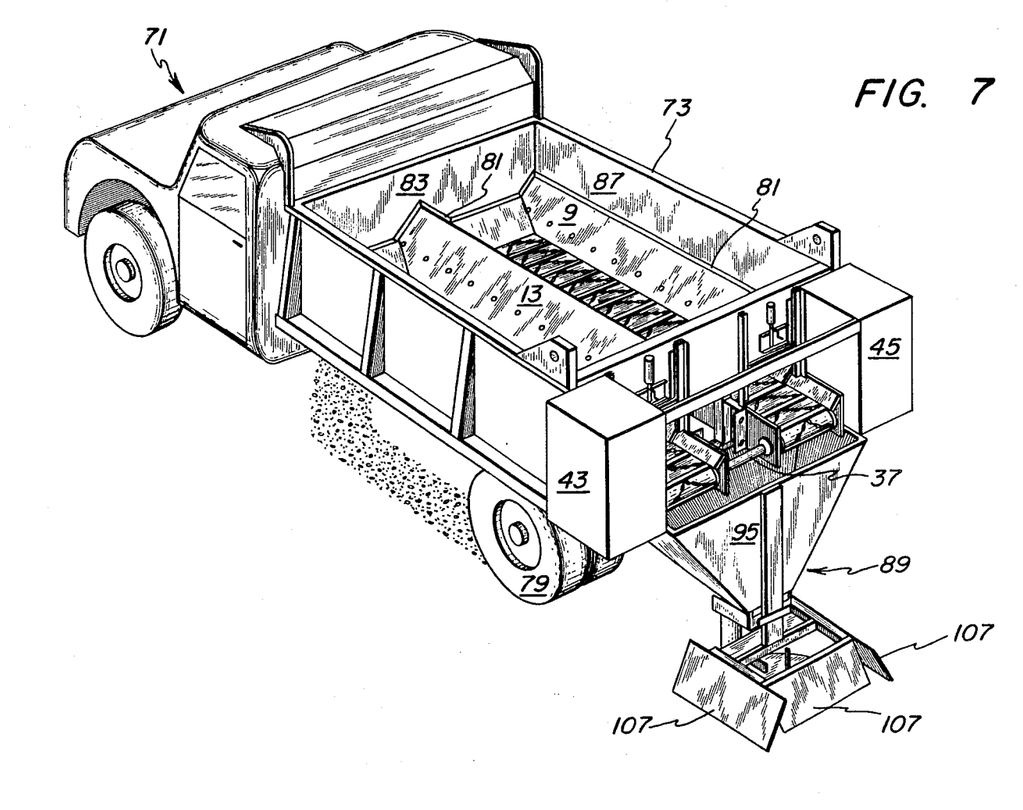
FIG. 7 shows a dump truck mounting the dual conveyor embodiment along with the discharge chute and spinner assembly.
Figure 8:
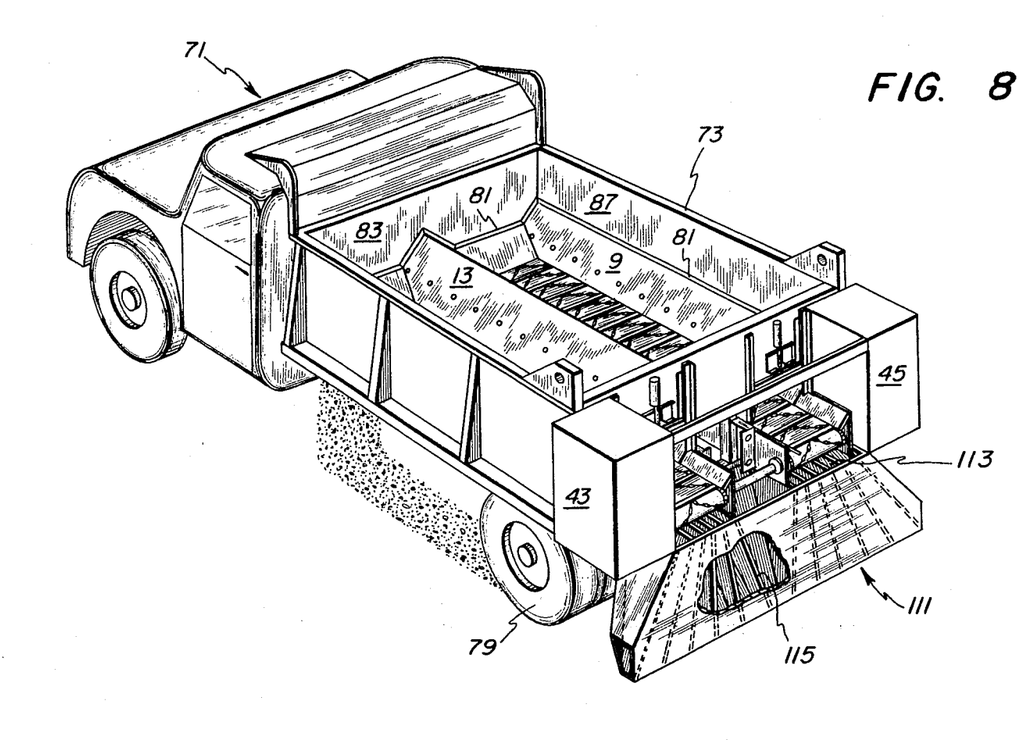
FIG. 8 shows a dump truck mounting the dual conveyor embodiment along with a drop spread chute.

In use on a dump truck 71 to convert the dump truck 71 to a dual conveyor, the tailgate is removed from the dump truck body 73 and the dual conveyor embodiment 1 of this invention is appropriately inserted, disposed and positioned within the dump truck body 73, as shown in FIGS. 3, 7 and 8, and appropriately secured therewith. Slots 75 in the floor 77 of the dump truck body 73 function to permit material from the return run of the conveyors 33 and 35 to fall through such slots 75 in the paths in front of the rear wheels 79 of the dump truck 71 to provide traction. A rubber sealing strip 81 is appropriately interposed between the upper end of the converging front wall 3 and converging outside walls 7 and 9, and the respective front wall 83, and side walls 85 and 87, of the dump truck body 73.

Figure 5:
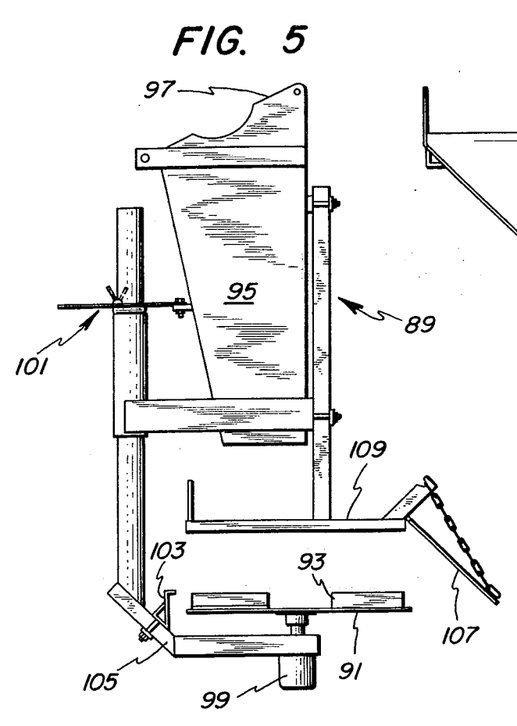
FIG. 5 is a side elevation of the discharge chute and spinner assembly.
Figure 6:
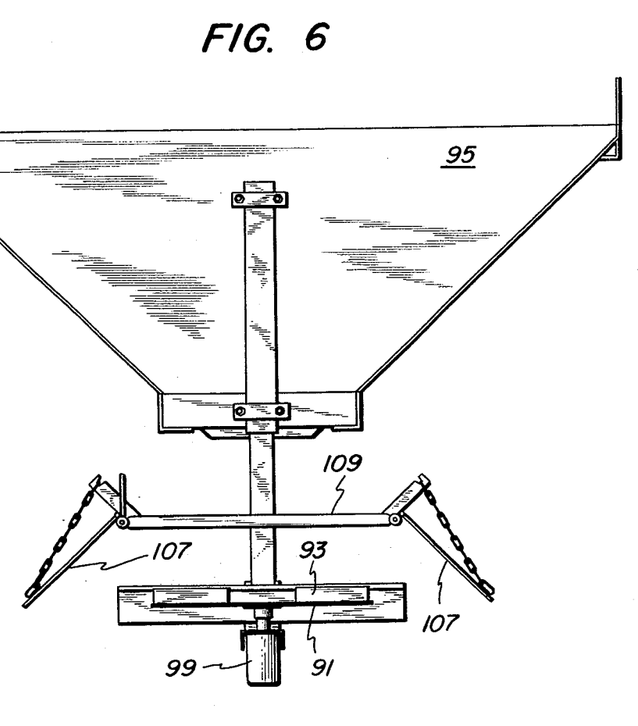
FIG. 6 is a front elevation of the discharge chute and spinner assembly.

FIGS. 5 and 6 show a conventional discharge chute and spinner assembly referred to by reference numeral 89 that is shown in FIG. 7 operatively mounted on the rear of the dual conveyor embodiment 1 of this invention to spread over a greater area the granular material the spinner disc 91 having vanes 93 receives from the conveyors 33 and 35 via the discharge chute 95 fixedly mounted at its upper portion 97 with the support structure (not shown) associated with the mounting of covers 43 and 45. A hydraulic motor 99 operatively connected to spinner disc 91 imparts drive thereto. A spinner adjusting arm mechanism 101 provides relative adjustment with respect to discharge chute 95. A front deflector 103 is carried on spinner support 105 relative to spinner disc 91. Deflectors 107 adjustably mounted on framing structure 109 permit adjustment and confinement of the area of material spread by spinner disc 91.

The difference between FIGS. 7 and 8 of the drawings is the fact that in FIG. 8 a drop spread chute 111 is used instead of the discharge chute and spinner assembly 89 utilized in FIG. 7. Drop spread chute 111 is utilized to confine material evenly to the approximate eight-foot width of the dump truck 71. Drop spread chute 111 similarly is fixedly mounted at its upper portion with support structure (not shown) associated with the mounting of covers 43 and 45. Material from the "load-side" run of the conveyors 33 and 35 is received through the top grills 113 in the uppermost portion of drop spread chute 111. Such material then is conducted and discharged downwardly through the open bottom of drop spread chute 111. Integral diverging vanes 115 on drop spread chute 111 assure even material flow and spreading throughout the spreading width of the drop spread chute 111. Chute 111 is wall enclosed except for its communicating top grills 113 and its open bottom.

Figure 2:
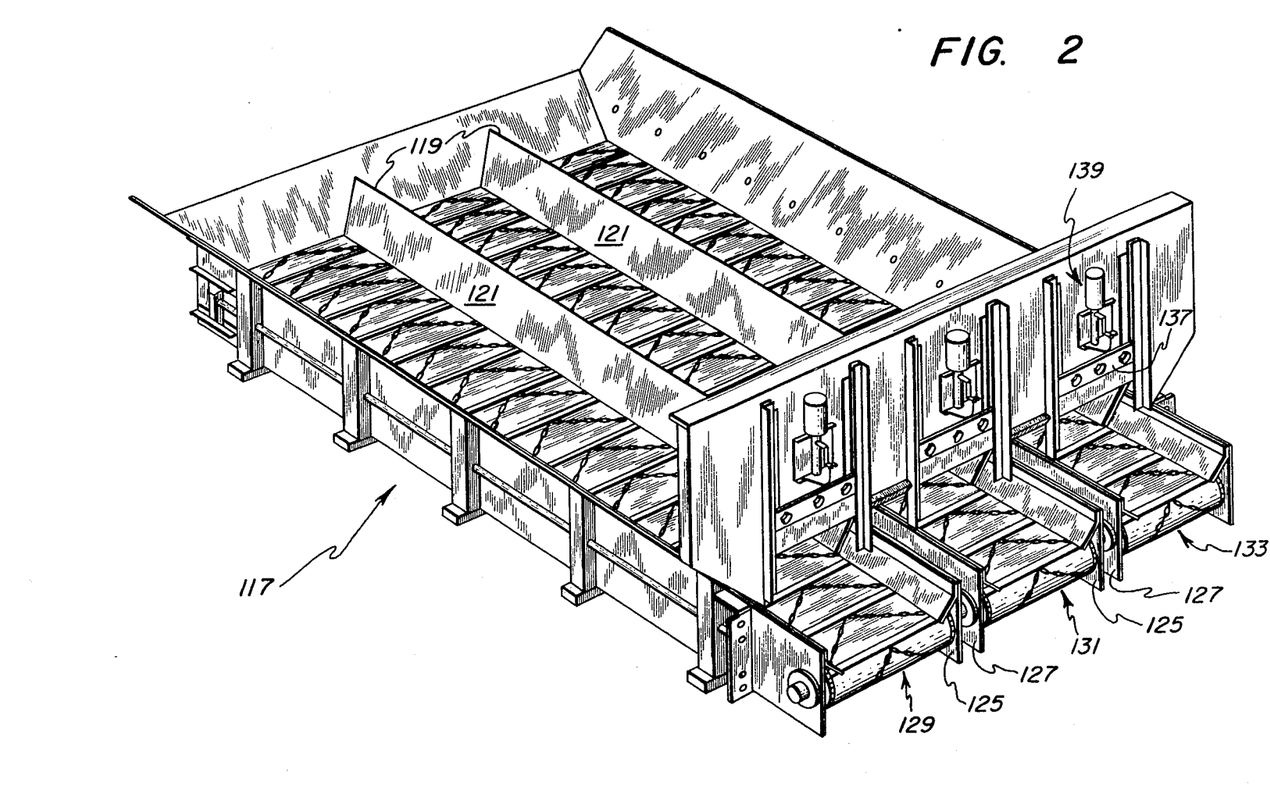
FIG. 2 is a view of the triple conveyor embodiment of the invention.

In FIG. 2 of the drawings, reference numeral 117 generally refers to the triple conveyor embodiment of the invention.

The structure of the triple conveyor 117 is similar to that of the dual conveyor 1 with the exceptions: that there are two longitudinal dividers 119 each defining converging middle walls 121 and 123 that are welded or otherwise suitably fixed to the corresponding angled portions upstanding from vertical walls 125 and 127 instead of being bolted thereto as in the dual conveyor embodiment 1; and that there are three bottom longitudinally extending conveyors 129, 131 and 133 with drive thereto imparted by the hydraulic-cylinder, power-transfer system similar to the power-transfer system utilized in the dual conveyor embodiment 1. Similarly, the structure of the conveyors 129, 131 and 133 is similar to that of the conveyors 33 and 35, along with idler rollers 135. The metering gates 137 along with their height adjustment mechanisms 139 are similar to the metering gates 63 and height adjustment mechanisms 67 utilized in the dual conveyor embodiment 1.

Figure 9:
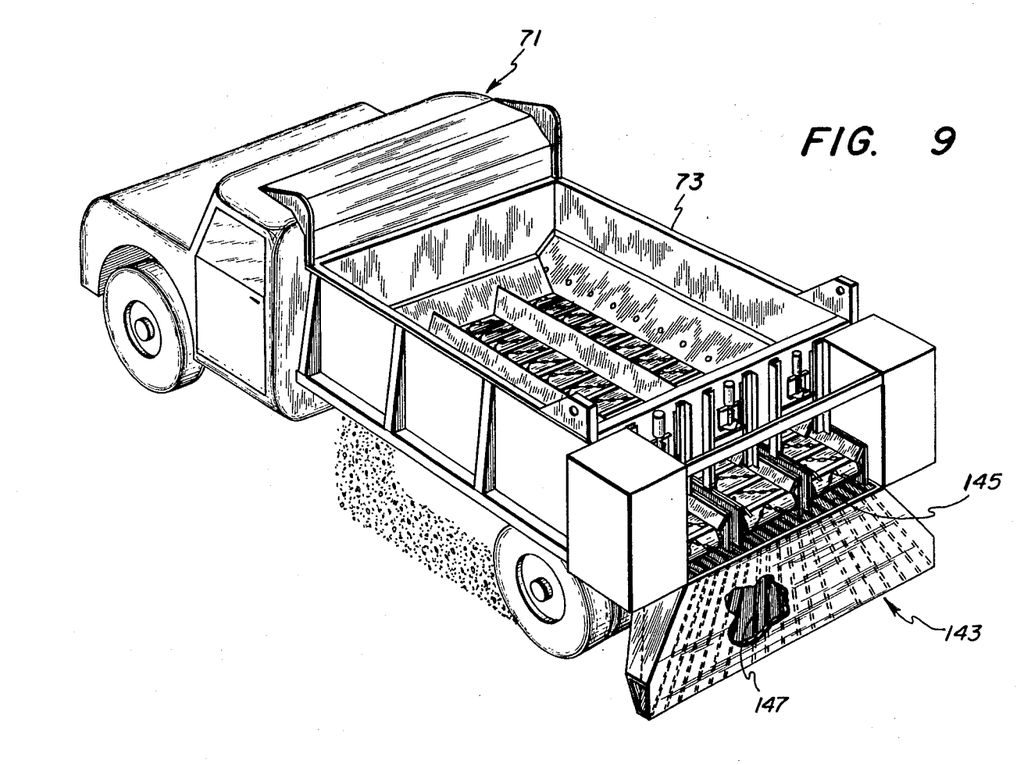
FIG. 9 shows a dump truck mounting the triple conveyor embodiment along with the top spread chute.
Figure 10:
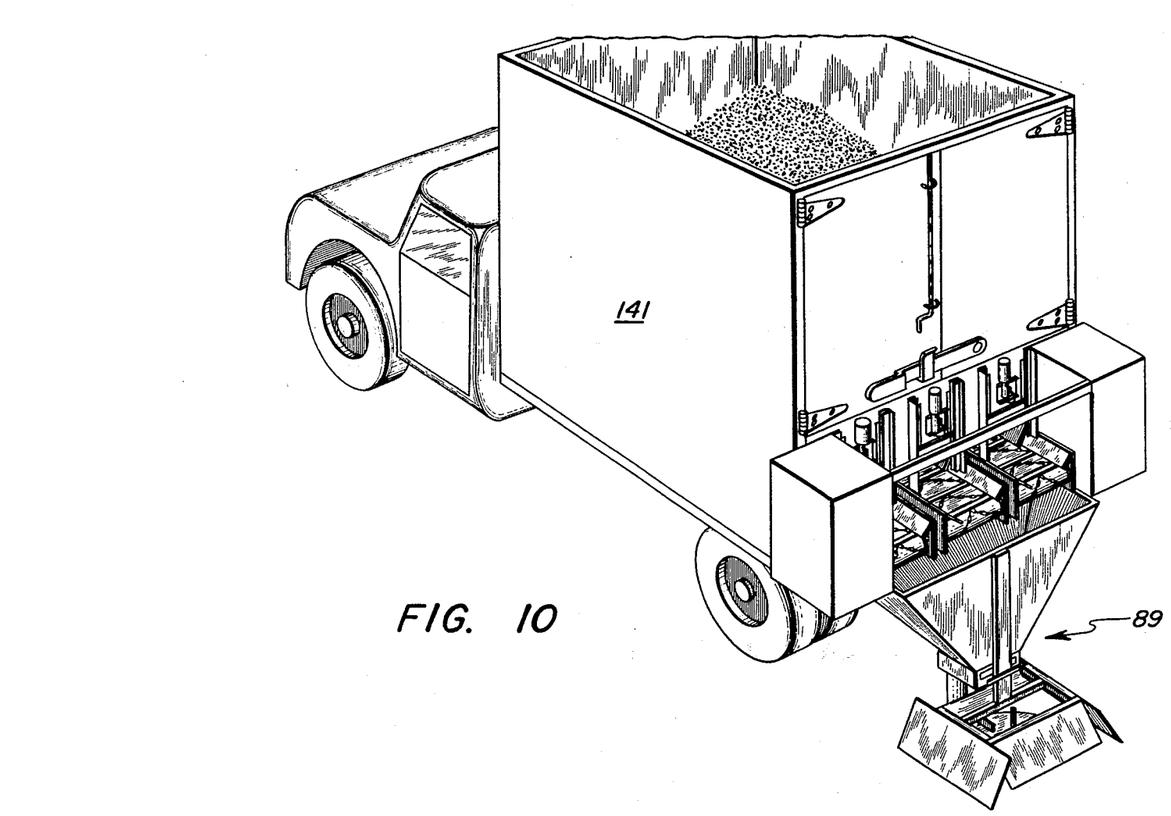
FIG. 10 shows a van type body mounting the triple conveyor embodiment along with the discharge chute and spinner assembly.

FIG. 9 demonstrates utilizing the triple conveyor embodiment 117 with a dump truck body 73 to convert same for use as a triple conveyor. FIG. 10 demonstrates utilizing the triple conveyor embodiment 117 with a van type body 141 to convert same for use as a triple conveyor. FIG. 9 shows a drop spread chute 143 being utilized while FIG. 10 shows a conventional discharge chute and spinner assembly 89 being utilized. Of course, the drop spread chute 143 can be used with the van type body 141 and the discharge chute and spinner assembly 89 can be utilized with the dump truck body 73. The drop spread chute 143 differs from the drop spread chute 111 in that chute 143 has three top grills 145 and more diverging vanes 147.

Having thusly described my invention, I claim:

1. A self-contained unit insertable in and in combination with a vehicle whose body has front and side walls, said unit being used with said vehicle body's front and side walls, said unit having multiple conveyors for spreading, unloading or dumping therefrom bulk granular material such as salt, sand, grain, fertilizer; said unit having a converging front wall, a vertical rear wall, two converging outside walls, and inverted, V-shaped longitudinal divider means, said vehicle body's front wall forming a continuation of said unit's front wall, and said vehicle body's side walls forming continuations of said units outside walls; said converging-front, vertical-rear and converging-outside walls, and said divider means, together with said vehicle body's front and side walls, defining multiple hopper compartments, and each of said hopper compartments having one of said conveyors operatively associated therewith for removing such material.

2. A self-contained unit in accordance with claim 1, wherein said unit has outside vertical walls and middle vertical walls, wherein said unit's outside vertical walls carrying said converging outside walls in fixed relationship therewith, and wherein said unit's middle vertical walls carry said divider means in fixed relationship therewith.

3. A self-contained unit in accordance with claim 2, wherein said divider means comprises a divider defining converging middle walls and wherein said unit's middle vertical walls carry said converging middle walls in fixed relationship therewith.

4. A self-contained unit in accordance with claim 1, wherein said unit has outside vertical walls and inside vertical walls, wherein said unit's outside vertical walls carry said converging outside walls in fixed relationship therewith, wherein said unit's inside vertical walls carry said divider means in fixed relationship therewith, wherein said converging-front, vertical-rear and converging-outside walls, and said divider means, together with said vehicle body's front and side walls, define two hopper compartments, and wherein said converging-front and vertical-rear walls, and said divider means, together with said vehicle body's front wall, define a third hopper compartment.

5. A self-contained unit in accordance with claim 4, wherein said divider means comprises two inverted, V-shaped longitudinal dividers.

6. A self-contained unit in accordance with claim 1, wherein said conveyors are of the bottom longitudinally extending type.

7. A self-contained unit in accordance with claim 1, wherein said vertical real wall has discharge opening means for controlling the amount of material conveyed from said unit.

8. A self-contained unit in accordance with claim 1, wherein said unit has a drop spread chute to receive material removed from said unit to conduct such material downwardly therethrough and to discharge such material evenly therefrom.

9. A self-contained unit in accordance with claim 8, wherein said drop spread chute has diverging vanes.

* * * * *